Patented Apr. 27, 1948

2,440,477

UNITED STATES PATENT OFFICE 2,440,477

SYNTHETIC DRYING OILS

Warren W. Johnstone, Riverside, Ill., assignor to Universal Oil Products Company, Chicago, Ill., a corporation of Delaware No Drawing. Application November 29, 1943
Serial No. 512,271

13 Claims. (Cl. 196—78)

This is a continuation-in-part of my co-pending application Serial No. 469,037 filed December 14, 1942, now abandoned.

This invention relates to a new class of material having the properties of a drying oil and more particularly to a method for preparing the material.

An object of the invention is the production of a drying oil material by reacting olefin-containing hydrocarbons in the presence of a hydrogen fluoride catalyst followed by separation of the reaction products into a hydrocarbon phase and a catalyst phase and recovery of the drying oil from the catalyst phase.

A further object of my invention is to prepare a material having the properties of a drying oil suitable for use in varnishes, paints and other protective and decorative coatings by treating the used catalyst phase which is separated from a hydrocarbon conversion process effected in the presence of hydrogen fluoride.

Broadly, my invention comprises reacting a hydrocarbon charging stock in the presence of hydrogen fluoride, separating the reaction mixture into a hydrocarbon phase and a hydrogen fluoride phase and recovering from the hydrogen fluoride phase an oil having drying properties.

In one embodiment the present invention relates to a process for the preparation of an oil having the properties of a drying oil which comprises reacting olefin-containing hydrocarbons in the presence of hydrogen fluoride, introducing the reaction mixture into a settling zone and therein separating an upper hydrocarbon layer from a lower hydrogen fluoride layer containing organic diluent, separating hydrogen fluoride from said hydrogen fluoride layer and recovering the substantially fluorine-free organic diluent.

When hydrocarbon reactions are carried out in the presence of hydrogen fluoride as a catalyst, the used catalyst contains certain valuable organic compounds. It is this organic material which can be recovered from the used catalyst which is referred to in the present specification and claims as organic diluent. It is believed that some of the hydrocarbon compounds of the organic diluent are physically entrained or dissolved in the used catalyst while the remainder are in the form of complex compounds with the acid. In addition, the organic diluent, before purification, usually contains a small proportion of organic fluorides.

Conversion processes which employ hydrogen fluoride as catalyst and in which a catalyst layer containing organic diluent is formed during reaction include the polymerization of normally gaseous or normally liquid olefin hydrocarbons, the alkylation of isoparaffins with olefins, the alkylation of aromatics, etc.

Although oils prepared from olefin-containing charging stocks are preferred, oils having useful applications can also be prepared from aromatic charges. In processes such as those previously mentioned, the reaction mixture is allowed to settle and a catalyst phase is separated from the hydrocarbon phase, this catalyst phase containing hydrogen fluoride and the organic diluent which comprises the drying oil product of my invention. In general the material recovered from the catalyst phase comprises a series of compounds of wide boiling range but homologous structure having more than two double bonds per molecule. The exact composition of the oil will vary somewhat, however, depending upon the particular charging material and the conditions of operation employed.

A typical operation for the manufacture of the drying oil product of my invention may be carried out according to the following description.

A hydrocarbon charge containing normally gaseous and/or normally liquid olefins is treated in the presence of hydrogen fluoride under sufficient pressure to maintain the mixture in substantially liquid phase, said pressure usually being below about 500 pounds per square inch. Intimate contact between the hydrocarbons and catalyst may be maintained by some form of agitation, such as mixing, stirring, etc., so as to form a mixture or emulsion of hydrocarbon and hydrogen fluoride. A reaction temperature of from about 0° to about 300° F., and preferably from about 50° to about 200° F., is usually employed. Upon completion of the reaction, the products are allowed to settle, and a hydrocarbon layer is separated from the catalyst layer which comprises chiefly acid and organic diluent. The catalyst phase is then directed to an acid-recovery zone wherein hydrogen fluoride is separated by distillation, treatment with water and/or aqueous alkali or other suitable means, and recycled to the reaction zone.

The material remaining after removal of hydrogen fluoride may be treated in a number of ways to remove any free acid left and to obtain a purified drying oil. A simple method comprises either steam or vacuum distillation to recover an oil having the desired properties.

Alternatively, the purified organic diluent may be recovered by commingling the catalyst layer with water. The water serves to dissolve any free acid present, while the organic diluent rises to the top of the mixture and may be withdrawn. If desired, the fluidity of the catalyst layer may be increased by commingling it with a nonreactive hydrogen solvent, such as pentane, and after thorough mixing, the solution is treated with a suitable alkaline reagent to neutralize any remaining free acid present. The treated mixture is directed to a separation zone in which the hydrocarbon solvent is removed by suitable means, such as distillation, and the finished drying oil product recovered. The hydrocarbon solvent may be recycled for further use.

The drying oil product is a sweet-smelling material, ranging in color from light yellow to dark brown, and on exposure to air dries to a solid film. It has an average molecular weight of from about 250 to about 500, although oils having molecular weights of as low as about 100 to as high as about 1000 have been prepared, these oils comprising compounds of the same homologous structure and properties. These properties include bromine numbers of about 120 to about 200; average number of double bonds per molecule, more than 2 and less than 4; densities of about 0.85 to about 0.95; specific dispersions of about 125 to about 175 and specific refractions of about 0.327 to about 0.335.

The following data are presented to illustrate the preparation of the organic diluent and its characteristic properties. The data are representative and are not to be considered as limiting the invention in accordance therewith.

Example I 438 grams of debutanized polymer gasoline was charged to a reactor to which was added 137 grams of hydrogen fluoride. The mixture was stirred constantly during the conversion which took place at a temperature of 100° C. and a pressure ranging from 20 to 70 pounds per square inch. After completion of the reaction, the products were directed to a settling zone wherein they were separated into an upper layer comprising essentially saturated hydrocarbons and a lower layer containing hydrogen fluoride and organic diluent. The catalyst layer was withdrawn to a distillation zone from which the hydrogen fluoride was removed and recycled to the reaction zone while the organic diluent was recovered as the product of the process. 347.6 grams of the hydrocarbon product was formed and 217.6 grams of catalyst layer, from which 104.2 grams of organic diluent was recovered. The properties of the organic diluent were as follows:

| | |
|---|---|
| Molecular weight | 326 |
| Index of refraction ($n_D^{20}$) | 1.4929 |
| Specific dispersion | 150 |
| Density ($d_4^{20}$) | 0.872 |
| Specific refraction | 0.333 |
| Color, Gardner | 15 |
| Bromine No | 150 |

Example II 438 grams of the same debutanized polymer gasoline was reacted as described in Example I, with 120 grams of hydrogen fluoride at a temperature of 38° C. 369.5 grams of hydrocarbon layer was formed and 173.4 grams of catalyst layer. From the catalyst layer, 71.1 grams of organic diluent was recovered. The properties of the organic diluent were:

| | |
|---|---|
| Molecular weight | 277 |
| Index of refraction ($n_D^{20}$) | 1.4830 |
| Specific dispersion | 138 |
| Density ($d_4^{20}$) | 0.856 |
| Specific refraction | 0.334 |
| Color, Gardner | 12 |
| Bromine No | 191 |

Example III

Organic diluent recovered from a catalyst layer produced when reacting isobutane with butylenes under alkylating conditions in the presence of hydrogen fluoride was found to have the following characteristic properties:

| | |
|---|---|
| Molecular weight | 250 |
| Density ($d_4^{20}$) | 0.862 |
| Specific dispersion | 137 |
| Index of refraction ($n_D^{20}$) | 1.4829 |
| Double bonds per molecule | 2.8 |

When the reaction conditions were varied somewhat but employing the same charging materials and recycled hydrogen fluoride, an organic diluent was recovered having these properties:

| | |
|---|---|
| Molecular weight | 302 |
| Density ($d_4^{20}$) | 0.902 |
| Specific dispersion | 150 |
| Index of refraction ($n_D^{20}$) | 1.5052 |
| Double bonds per molecule | 3.7 |

Example IV

When iso-octene was reacted in the presence of hydrogen fluoride, the organic diluent recovered from the catalyst phase had these properties:

| | |
|---|---|
| Molecular weight | 330 |
| Density ($d_4^{20}$) | 0.893 |
| Specific dispersion | 140 |
| Index of refraction ($n_D^{20}$) | 1.4959 |
| Double bonds per molecule | 3.6 |

A test of the drying properties of the organic diluent showed that it dries much faster than raw linseed oil with or without a siccative.

I claim as my invention:

1. A process for the preparation of a drying oil which comprises reacting a hydrocarbon fraction containing olefins in the presence of a hydrogen fluoride catalyst, separating the reaction mixture into a catalyst phase and a hydrocarbon phase, removing hydrogen fluoride from said catalyst phase thereby leaving a residual organic material, treating said residual organic material with an alkaline reagent to neutralize free acid therein, and recovering the acid-free organic material as said drying oil.

2. A process for the preparation of a drying oil which comprises reacting an olefin-containing hydrocarbon in the presence of a hydrogen fluoride catalyst, separating the reaction mixture into a catalyst phase and a hydrocarbon phase, subjecting the catalyst phase to distillation to separate hydrogen fluoride from residual organic material, treating the latter with an alkaline reagent to neutralize free acid therein, and recovering the acid-free organic material as said drying oil.

3. A process for the manufacture of a drying oil which comprises reacting an olefin-containing hydrocarbon in the presence of a hydrogen fluoride catalyst, separating the reaction mixture into a catalyst phase and a hydrocarbon phase, removing hydrogen fluoride from said catalyst phase thereby leaving a residual organic material, commingling said residual organic material with a non-reactive hydrocarbon solvent, treating the resultant solution with an alkaline reagent to neutralize free acid, separating said solvent, and recovering the acid-free organic material as said drying oil.

4. A process for the manufacture of a drying oil which comprises reacting an olefin-containing hydrocarbon in the presence of a hydrogen fluoride catalyst, separating the reaction mixture into a catalyst phase and a hydrocarbon phase, diluting the catalyst phase with water to cause separation of a layer of residual organic material from an aqueous hydrogen fluoride layer, treating said layer of residual organic material with an alkaline reagent to neutralize free acid therein, and recovering the acid-free organic material as said drying oil.

5. A process for the preparation of a drying oil which comprises reacting an olefin-containing hydrocarbon in the presence of a hydrogen fluoride catalyst, separating the reaction mixture into a catalyst phase and a hydrocarbon phase, subjecting the catalyst phase to distillation to separate hydrogen fluoride from residual organic material, commingling said residual organic material with a non-reactive hydrocarbon solvent, treating the resultant solution with an alkaline reagent to neutralize free acid, separating said solvent, and recovering the acid-free organic material as said drying oil.

6. A process for the manufacture of a drying oil which comprises reacting an olefin-containing hydrocarbon in the presence of a hydrogen fluoride catalyst, separating the reaction mixture into a catalyst phase and a hydrocarbon phase, diluting the catalyst phase with water to cause separation of a layer of residual organic material from an aqueous hydrogen fluoride layer, commingling said residual organic material with a non-reactive hydrocarbon solvent, treating the resultant solution with an alkaline reagent to neutralize free acid, separating said solvent, and recovering the acid-free organic material as said drying oil.

7. The process of claim 1 further characterized in that the reaction of said olefin-containing hydrocarbon fraction is effected at a temperature of from about 0° F. to about 300° F. and a pressure sufficient to maintain the reaction mixture in substantially the liquid phase.

8. The process of claim 3 further characterized in that said solvent comprises pentane.

9. The process of claim 3 further characterized in that said solvent is separated by distillation.

10. The process as defined in claim 1 further characterized in that said hydrocarbon fraction comprises normally liquid olefins.

11. The process as defined in claim 3 further characterized in that said hydrocarbon is a normally liquid olefin.

12. The process as defined in claim 1 further characterized in that said hydrocarbon fraction comprises polymer gasoline.

13. The process as defined in claim 1 further characterized in that said hydrocarbon fraction comprises isooctene.

WARREN W. JOHNSTONE.

REFERENCES CITED

The following references are of record in the file of this patent:

UNITED STATES PATENTS

| Number | Name | Date |
|---|---|---|
| 1,885,060 | Hofmann | Oct. 25, 1932 |
| 2,076,581 | Kharasch | Apr. 13, 1937 |
| 2,166,502 | Milmore | July 18, 1939 |
| 2,217,919 | Rostler | Oct. 15, 1940 |
| 2,253,323 | Christmann | Aug. 19, 1941 |
| 2,320,629 | Matuszak | June 1, 1943 |
| 2,342,677 | Linn | Feb. 29, 1944 |
| 2,371,341 | Matuszak | Mar. 13, 1945 |
| 2,371,652 | Rostler et al. | Mar. 20, 1945 |
| 2,375,675 | Matuszak | May 8, 1945 |

OTHER REFERENCES

Grosse et al., Article in Jour. of Organic Chem., vol. III (1938), pages 26–32.

Ipatieff et al., Article in Jour. Amer. Chem. Soc., vol. 58 (June 1936), pages 915–917.